United States Patent
Balçik (10) Patent No.: US 9,662,604 B2
(45) Date of Patent: May 30, 2017

(54) TELESCOPIC CLEANING SYSTEM FOR EXHAUST AIR FILTERS

(71) Applicant: ADEBA MÜHENDİSLİK, DANİŞMANLIK, HALKLA İLİŞKİLER, İNŞAAT VE TİCARET A.Ş., Izmir (TR)

(72) Inventor: Hasan Engin Balçik, Izmir (TR)

(73) Assignee: ADEBA MÜHENDISLIK, DANISMANLIK, HALKLA ILISKILER, INSAAT VE TICARET A.S., Izmir (TR)

( * ) Notice: Subject to any disclaimer, the term of this patent is extended or adjusted under 35 U.S.C. 154(b) by 33 days.

(21) Appl. No.: 14/770,257

(22) PCT Filed: Feb. 3, 2014

(86) PCT No.: PCT/TR2014/000032
§ 371 (c)(1),
(2) Date: Aug. 25, 2015

(87) PCT Pub. No.: WO2014/133474
PCT Pub. Date: Sep. 4, 2014

(65) Prior Publication Data
US 2016/0001213 A1 Jan. 7, 2016

(30) Foreign Application Priority Data
Feb. 26, 2013 (TR) ............... a 2013 02290

(51) Int. Cl.
*B01D 46/00* (2006.01)
*B01D 46/02* (2006.01)
*B01D 46/44* (2006.01)
(52) U.S. Cl.
CPC ....... *B01D 46/0068* (2013.01); *B01D 46/023* (2013.01); *B01D 46/442* (2013.01)

(58) Field of Classification Search
CPC . B01D 46/00; B01D 46/0064–46/0071; B01D 46/0082; B01D 46/023; B01D 46/442
USPC ....................................... 55/282–305; 96/417
See application file for complete search history.

(56) References Cited

U.S. PATENT DOCUMENTS

| 4,220,459 A | 9/1980 | Hammond et al. |
| 5,305,493 A | 4/1994 | Prenn |
| 2009/0107337 A1* | 4/2009 | Vu ..................... B01D 46/0021 95/279 |

FOREIGN PATENT DOCUMENTS

| DE | 33 36 918 A1 | 4/1985 |
| DE | 10 2010 010 838 A1 | 9/2011 |

OTHER PUBLICATIONS

International Search Report issued in connection with PCT/TR2014/000032.

* cited by examiner

*Primary Examiner* — T. Bennett McKenzie
(74) *Attorney, Agent, or Firm* — Egbert Law Offices, PLLC (57) ABSTRACT

This invention is related with the internal cleaning system (Telescopic Cleaning System (10)) of centralized extraction and filtration units (1) of industrial exhaust gases aiming to reduce overall energy consumption of such system by; avoiding the usage of compressed air being replaced with available exhaust air of the system, accelerated and applied thoroughly all surfaces of the cassette filters (2) by the help of Telescopic Cleaning System (10) and delivering efficiently cleaned filters, generating less resistance over the filter unit (1) versus comparable existing designs by the help of such efficiently cleaned filters, leading to less energy consumption on exhaust air fan.

2 Claims, 8 Drawing Sheets

TELESCOPIC CLEANING SYSTEM FOR EXHAUST AIR FILTERS

This application is a national phase of PCT/TR2014/00032, filed Feb. 3, 2014, and claims priority to TR 2013/02290, filed Feb. 26, 2013, the entire contents of both of which are hereby incorporated by reference.

TECHNICAL FIELD

This invention; involves in internal cleaning system of centralized extraction and filtration units of industrial exhaust gases such as product dusts or process related emission gases that are generated during related process to be extracted from operational environment and to be discharged to atmosphere within the limits of environmental regulations.

Invention mainly covers a special telescopic cleaning system to be used at such extraction systems and filters, which is able to clean internal filtering materials by a cleaning head stands on a telescopic unit travelling all through the filter fabric surface. This enables the opportunity to use low pressure exhaust air coming out of the main suction fan at the system and consequently avoids the usage of compressed air, which is the current industry solution/standard worldwide. As a result, filters will be cleaned more effectively with almost no energy consumed.

PRIOR ART

Current technology uses Compressed Air as cleaning media in order to clean the filtering materials (usually synthetic fabrics) of the filtering systems located at the centralized extraction units. Compressed Air generated at the centralized compressor units is applied to the filters with regular intervals towards opposite of regular air flow direction. There exists also an additional blower pipe at the front of each filter line in order to apply such counter air flow to the filters. Besides, there exist compressed air storage tank as well as pipe connection for compressed air supply line.

Existing design/system works relatively in good condition but with several weaknesses. One of the biggest weaknesses is to consume high energy for internal filter cleaning function. System uses high amount of compressed air for filter cleaning. This compressed air is to be generated at other sub-functional units. Compressed air generation stations are normally one of the essentials of a manufacturing plant depending on process based capacity demands. However, such air filtering units increase demands and lead the operations to invest to higher capacity systems with higher initial investment (Capital Expenditure) needs.

Efficiency of the compressed air systems (generation as well as distribution network) are relatively low due functional weaknesses of network elements with quite high pressure drops and frequently observed leakages. The unit price of the compressed air generation is the highest among the other utility systems such as steam, hot-cold water, conditioned air etc. Moreover, the regular operational and maintenance cost of such compressors are quite expensive due to high end technology usage inside the units.

Beside, frequent compressed air cleaning cycle of filters with low performance increases energy consumption. Each filtering segment has got wide surface of approx. 1.5-2.0 m2 per each. Due to constructional reasons, compressed air is applied from the head of the filter cassette. As the compressed air is applied from one source towards to the end of filter cassette, it is normally released through the filter media before reaching to the end of the filter cassette and only mechanical shake (gradually disappearing) remains on filter media to clean. Consequently, filter media may not be cleaned with full surface and leads to gradually higher resistance to the air passing through due to less available surface remains. In truth, filter media manufacturers recommends a piece of dust cake to be remained on filter media surface for better cleaning for existing technology usages. In other words, improperly cleaned filters generate high resistance (high pressure drop), which forces the suction fan to consume more energy to be able to generate required volume of the units serving to. The cost of avoidable energy consumption of such systems is calculated roughly less than 5 years of such a system initial capital investment.

Beside, as the surface of the filters are not cleaned properly, the designers of such systems selects higher capacity/size filters than needed in order to avoid blocking of the filters and secure the functionality of systems. This leads companies to further increase their initial capital investments.

From environmental perspective, existing filtering segments are subject to heavy mechanical force of compressed air. This leads to wears & tears as well as fatigue of the filter media. Several filter media's are torn out prior to periodical maintenance and replacement cycle with high probability. As a result, un-cleaned air is possibly released to atmosphere. On the other hand, as there are so many filter segments inside each filter unit, the identification of torn out (faulty) filter is almost impossible and leads the operations to replace all filter segments with quite long downtime needs of the system serving to. Immediate correction of such faulty filters turns to crucial & unexpected downtimes (min. 3-4 hours) to operations especially running in 7 days 24 hours. Adding on lots of regular operational reasons as well as a long time need to replace all filters, some factories may keep the filtering systems improper until soonest available maintenance time is arrived. This generates the risk and reveals the weakness of existing systems as the environmental pollutions in case of a single filter torn out condition. Moreover, the necessity of all filter segments replacement increases operational expenses vs. avoidable service and filter replacement costs.

From employee health and safety perspective, due to the physical restrictions of existing design, compressed air accumulation tank as well as control valves are generally located at the top of the filters (approx. 4-5 mt. in height). This location is both difficult to reach as well as not convenient in order to do proper maintenance from employee perspective. On the other side, this location also generates a risk of providing unsafe working condition from employer perspective. In result, existing risky working condition remains unavoidable from employee safety perspective with existing design.

Moreover, existing system should be equipped with small compressed air storage tanks to be able to supply adequate amount of air to filters each time. These tanks have to be regularly checked by qualified inspectors once a year according to regulations. Due to difficult accessibility, proper physical & visual inspections may not be done securely; which is a kind of operational weakness of the design. On the other hand, this turns to an additional expense/cost to operations.

As a result, with below invention, there will be a wide range of improvement on existing design of air filtering units, which enables to eliminate above mentioned disadvantages as well as giving further functionalities to improve air cleaning & filtering systems.

OBJECT OF THE INVENTION

This invention is related with a new telescopic cleaning system on industrial air filter units covering all above mentioned needs by eliminating several disadvantages and improving the general performance of air cleaning systems.

One of the objectives of the invention is to reduce energy consumption of the system by eliminating compressed air usage necessity in filter's self-cleaning function through re utilizing the existing discharged/waste air of the system fan unit.

Another objective is to further reduce energy consumption of the system by reducing filter resistance (pressure drop) on filter units, which leads the suction fan to consume less energy to deliver required air amount for main system need. This is newlyenabled by means of a special Telescopic Cleaning Head movement in the filter unit that is applying reverse cleaning air at adequate level with balanced & well distributed manner throughout each cassette filter& media. By this function, filter media will continuously remain well cleaned leading to generate lower air passing resistance (pressure drop) and consume less energy vs. existing applications.

Another objective of the invention is to reduce initial capital investment need by ensuring better efficiency & performance vs. lower size. By ensuring to keep filter media's continuously well cleaned, smaller size of new units will support operations to reduce annual operational expenses by less filter media replacement needs as well as lower cost in initial investment.

Another objective of the invention is to provide simple, accessible units enabling execution of maintenance activities during operation mode, which is encouraging to have reliable and continuous systems for downstream systems in factories.

Another objective of the invention is to provide flexibility for quality control check of each filter via installing a sensor/camera on telescopic head. This will enable to detect faulty filter (burst, torn out etc.) individually among 100's of other filters. This will further drive an automatic warning system to inform operators. By identifying the faulty filter, operator will be able to replace such faulty filter in a short while and will help to avoid exhausting of un-cleaned air to atmosphere.

This invention covers industrial air cleaning filters and newly developed telescopic cleaning system as the benefits are generally mentioned above with below detailed working principles including;

- Minimum 1 telescopic head going in & out through each filter blowing reversely low pressure air to the both side of cassette type filters to be able to clean the filter media
- An vertical linear shaft holding mentioned telescopic head and driving the unit up & down
- 2 horizontal linear shafts holding telescopic head as well as horizontal linear shaft driving parts forward & backward
- Air inlet to connect accelerated air (Air Jet) to Telescopic Cleaning Head
- Piping to bring low pressure air from the discharge end of the exhaust air fan to telescopic head
- A special conically narrowing unit on the piping generating necessary cleaning air for the system working as an accelerator with Bernoulli principle to speed up the air Below is the detailed explanation of the invention with referring figures for easier and clear understanding of all infrastructural and characteristic details with all mentioned advantages. Hence, it is requested to evaluate the invention through following expressions and figures.

REFERENCE NUMBERS

1. Filter Unit
2. Filter cassettes
2.1. $1^{st}$ cassette filter
2.2. $2^{nd}$ cassette filter
2.3. $3^{rd}$ cassette filter
2.4. $4^{th}$ cassette filter
3. Dirty Air chamber
4. Clean Air chamber
5. Clean Air exit channel
6. Chimney
7. Suction/exhaust fan
8. Telescopic head driving motor
10. Filter cleaning System
11. Telescopic Head
12. Horizontal linear shaft
13. Horizontal linear shaft
14. Vertical linear shaft
15. Air Jet supply line entrance
16. Piping
17. Air Accelerating Unit
18. Chimney connection
19. Filter Quality control sensor
A: Dirty Air inlet
B: Clean Air outlet

DETAILED EXPLANATION OF INVENTION

Below explanation gives further details of mentioned telescopic cleaning system preferred structure with the objective of clear understanding of working principle with no limitation to claims.

With this invention, through developed mechanical structure; a dedicated cleaning system is structured with the help of telescopic unit working over 3 dimensional moving systems, which enables to effectively clean both side of filter surfaces. In parallel, system is enabled to use the discharge/exhaust air of the suction fan as cleaning media for filters with the help of conical mechanical structure that accelerates the air under Bernoulli principle generating air jet. Filter cleaning will be achieved through a reversed air application towards to the filter surfaces from a short distance application of air jet (low pressure/high speed)

This invention involves in internal cleaning system (so called Telescopic Cleaning System (10)) of centralized extraction and filtration unit (1) of industrial exhaust gases such as product dusts or process related emission gases that are generated during related process to be extracted from operational environment and to be discharged to atmosphere within the limits of environmental regulations.

Figure 1:
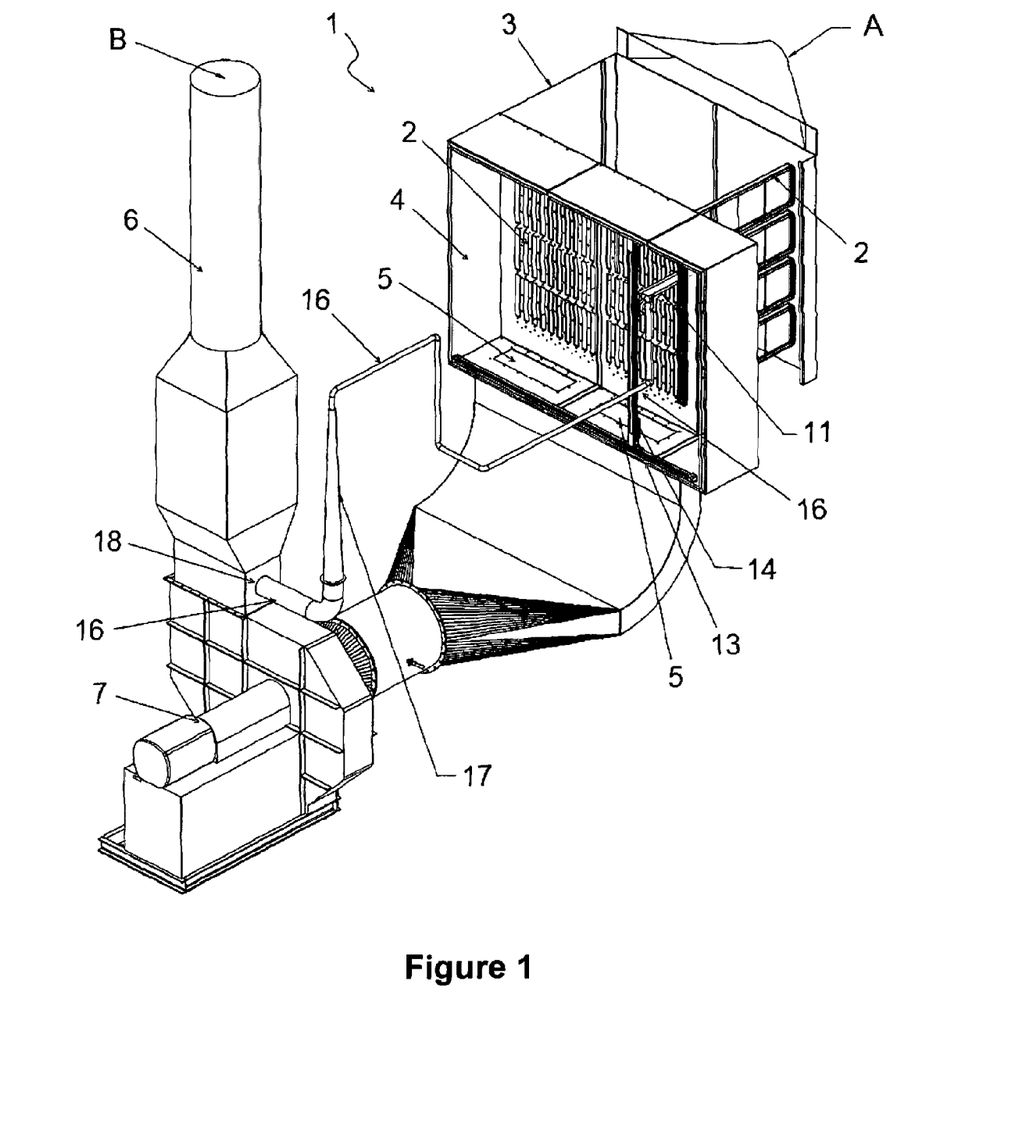
FIG. 1; A perspective view of such filtering unit with the application of telescopic cleaning system referred in this invention with the preferred option of 4 level of filters FIG. 2; A perspective view of filtering unit with the application of telescopic cleaning system showing air flow direction with arrows FIG. 3; A sectional view 4 level up filtering unit with the application of telescopic cleaning system showing air flow direction with arrows FIG. 4; A perspective view of telescopic cleaning system referred in this invention. At this stage, telescopic head is CLOSED and at the level of $1^{st}$ level of filter.

FIG. 1 shows the perspective view of a preferred application of telescopic cleaning system inside filtering system. Accordingly, filtering unit (1) is in the form of rectangular prismatic body having dirty air section (3), cassette type of filters (2) inside dirty air section (3), cleaned air section (4) aside dirty air section (3), exhaust air fan (7) generating the necessary suction air at required volume and pressure, chimney (6) blowing exhaust air to atmosphere and conical body accelerator (17) generating air jet as the usage of cleaning air for filters.

Figure 2:
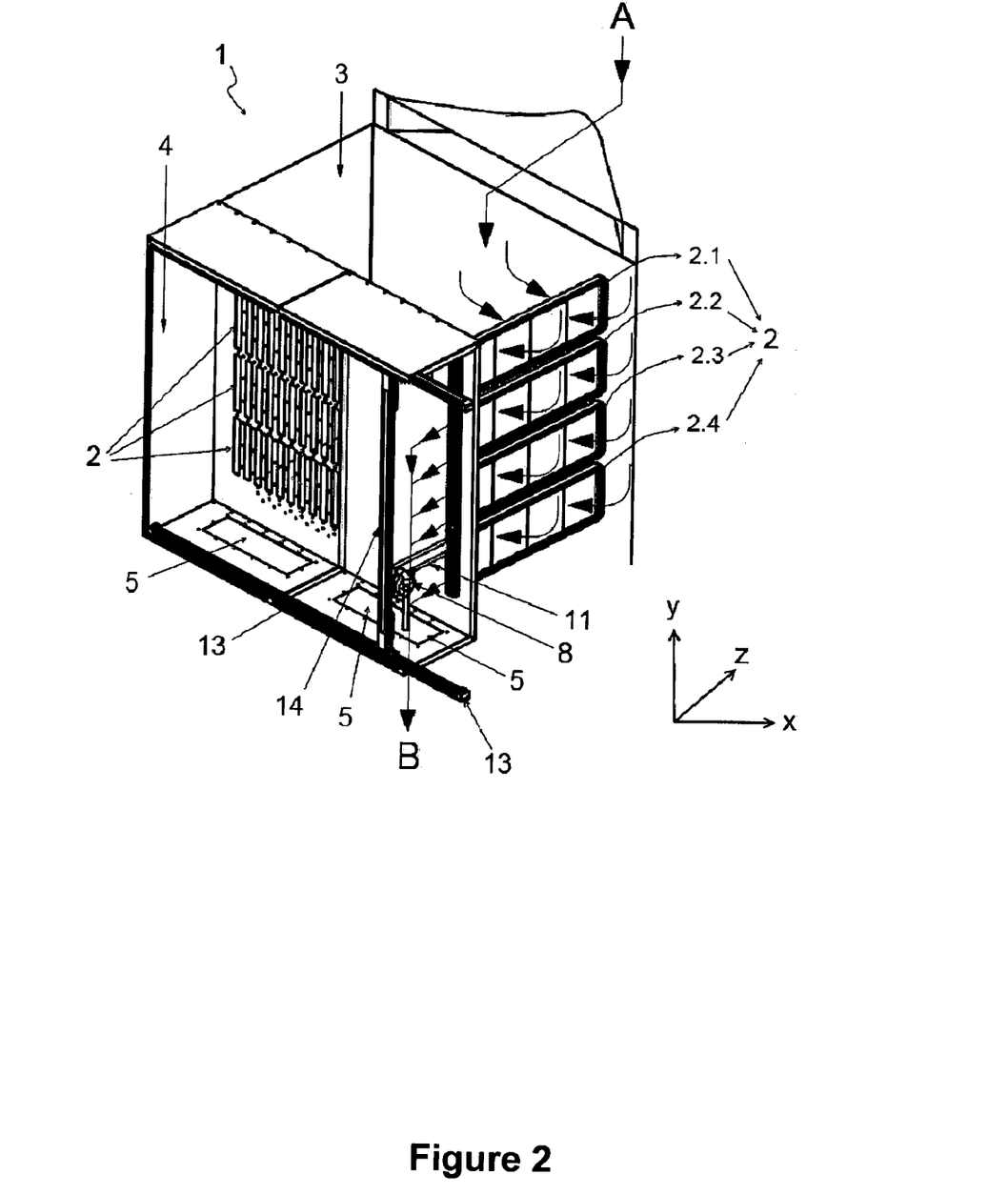

FIG. 2 is the perspective view of telescopic cleaning system (10) located inside filter body (1) at cleaned air section (4). There are cassette type of filters (2) distributed horizontally and vertically inside the dirty air section (3). According to the required capacity, the sizes of the dirty air section as well as the number of cassette filters (2) are defined. FIG. 2 shows the direction of air flow with the help of arrows. Dirty air enters to the dirty side of the filter unit from main inlet (A), cleaned through cassette type of filters (2), travels to cleaned air section (4) and discharged from outlet (5)

Figure 3:
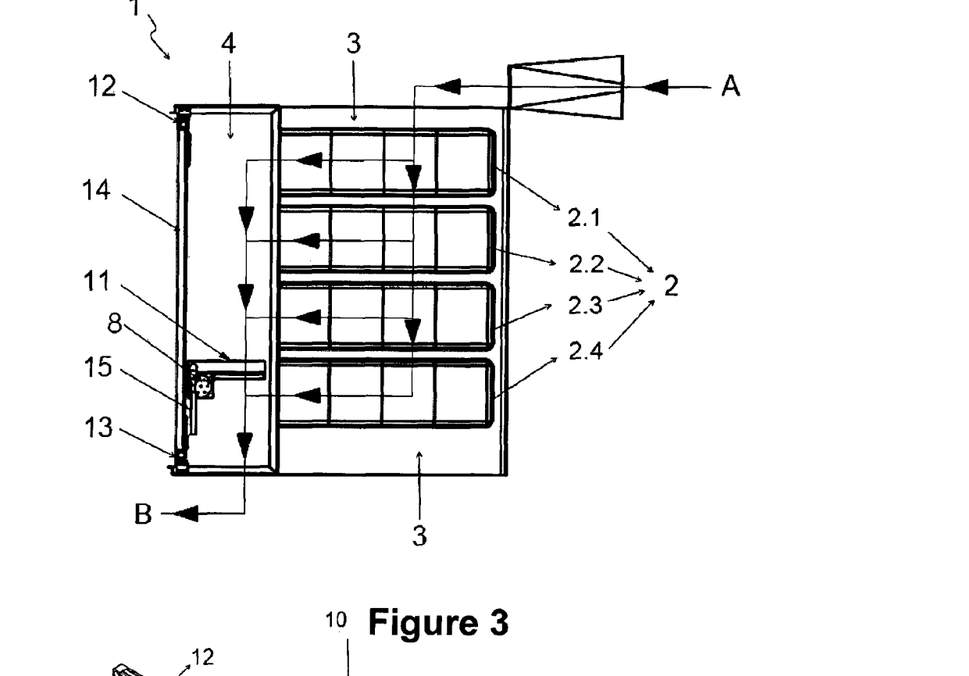

FIG. 3 gives the side view of filter unit (1) showing the direction of air during cleaning process through cassette filters (2). Cassette types of filters (2) are in horizontally and vertically distributed. Dirty air enters from the 1st level of filter (2.1) and travels to downwards to 2.2 while a portion of dirt air is cleaned by 2.1 cassette filter. This continues until the last cassette filter (2.4). As a result, the particles in dirty air remains on the surface of cassette type of filters (2) and cleaned air flows to cleaned air section (4) and outlet (B). The necessary air suction power is generated with a fan located in between filter unit (1) and chimney (6).

As explained above, through the cleaning process, dirty particles are accumulated on the surface of cassette type of filters (2). This condition necessitates the periodical cleaning of filters (2). Mentioned telescopic cleaning system (10) is developed for the cleaning of these filters with an mechanical movement & Air application inside cassette type of filters (2).

Figure 4:
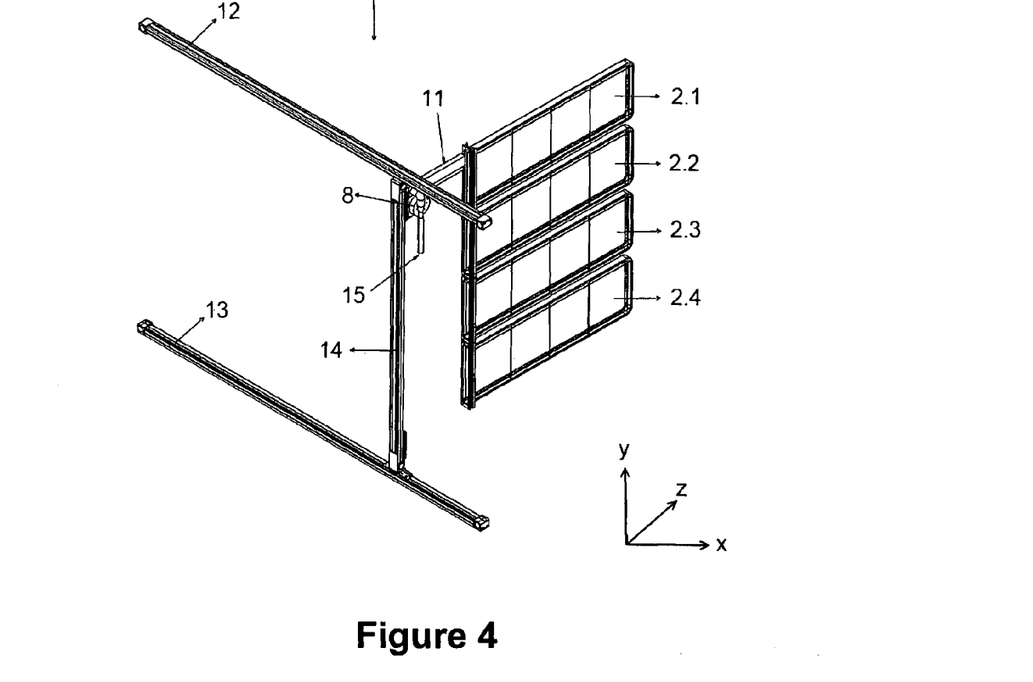

FIG. 4 gives the perspective view of telescopic cleaning system (10). Accordingly, system comprises of 2 horizontal movement profiles (12 & 13), 1 vertical movement profile (14) and telescopic head (11). Vertical profile is connected to horizontal profiles (12 13) and is able move in the direction of X-axes. Telescopic head (11) is located on vertical profile (14) and is able to up & down in the direction of Y-axes.

At FIG. 4, telescopic head (11) is in closed position. Telescopic head (11) is comprised of rectangular profiles with the variety of dimensions allowing each to enter to following profile size. These profiles guide the cleaning air till the end of head. At closed position, all such profiles remains within each other and occupies the minimum dimension of the telescopic head (11)

Telescopic head (11) is moved forward & backward in the direction of Z axes with a driving motor (8). Accordingly, this telescopic head (11) is able to move in 3 direction as axes of x, y and z as;
  Movement in axes Y is generated with the movement of vertical profile (14)
  Movement in axes X is generated with the movement of horizontal profiles (12 & 13)
  Movement in axes Z is generated with the movement of driving motor (8).

Telescopic head (11) is in closed position located in the cleaned air section (4) of filtering unit (1). Air jet required for filter cleaning is received through conical accelerator (1) from the outlet of exhaust air fan. There is a proper piping (16) till air inlet (15) of telescopic head. There is also a conical accelerator (17) piece on this piping, which is speeding up the exhaust air (high volume & low pressure) until air jet generation.

Moreover, there is a filter quality control sensor (19) at the front of telescopic head (10). This sensor (19) is able to monitor the dust ratio (dirtiness level of cleaned air) via an optical eye and is able to compare the quality of air with reference value. In case of exceeding value is recognized, it triggers an alarm signal for operators as there is a leak at that filter. As the telescopic head (11) moves in/out for each filter, this sensor (19) controls each cassette filter (2) quality and reports the results as report or alarm purpose.

Figure 5:
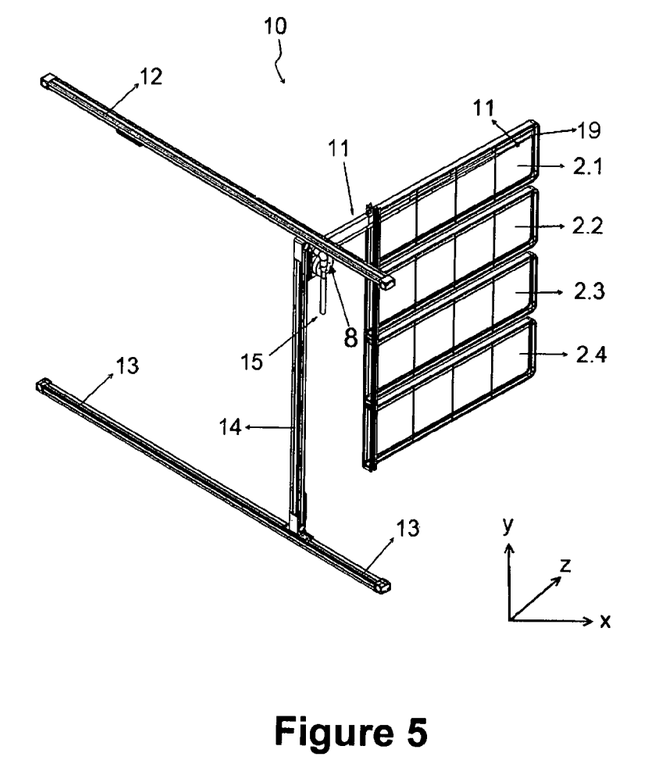
FIG. 5; A perspective view of telescopic cleaning system referred in this invention. At this stage, telescopic head is OPEN and at the level of $1^{st}$ level of filter.

Working principle of Telescopic cleaning system (10) is as follows:

Particles carried with dirty air entering from inlet (A) is accumulated on the surface of cassette filters (2) located in dirty air section (3) of filter unit and leads to fill up cells of filter media's on cassette filters (2). At this situation, Differential pressure sensor located in between dirty & clean air section of filter unit (1) generates the trigger signal to start the operation of telescopic head (10). In FIG. 4, telescopic head is in closed position and there is no air supplied to unit means air jet entrance is closed (15). Once the signal for filter dirtiness is generated, telescopic head (11) moves ahead in the axis of Z with the help of driving motor (8). In FIG. 5, telescopic head (11) is in open position and extended until the top end position of cassette no 2.1. Once the position is arrived, air entry (15) is opened in telescopic head (11). Afterwards, telescopic heads starts to move downwards (in the direction of Y axes) inside cassette filter (2) and cleans the whole surface of the filter (2) with reversely applied accelerated air.

Figure 6:
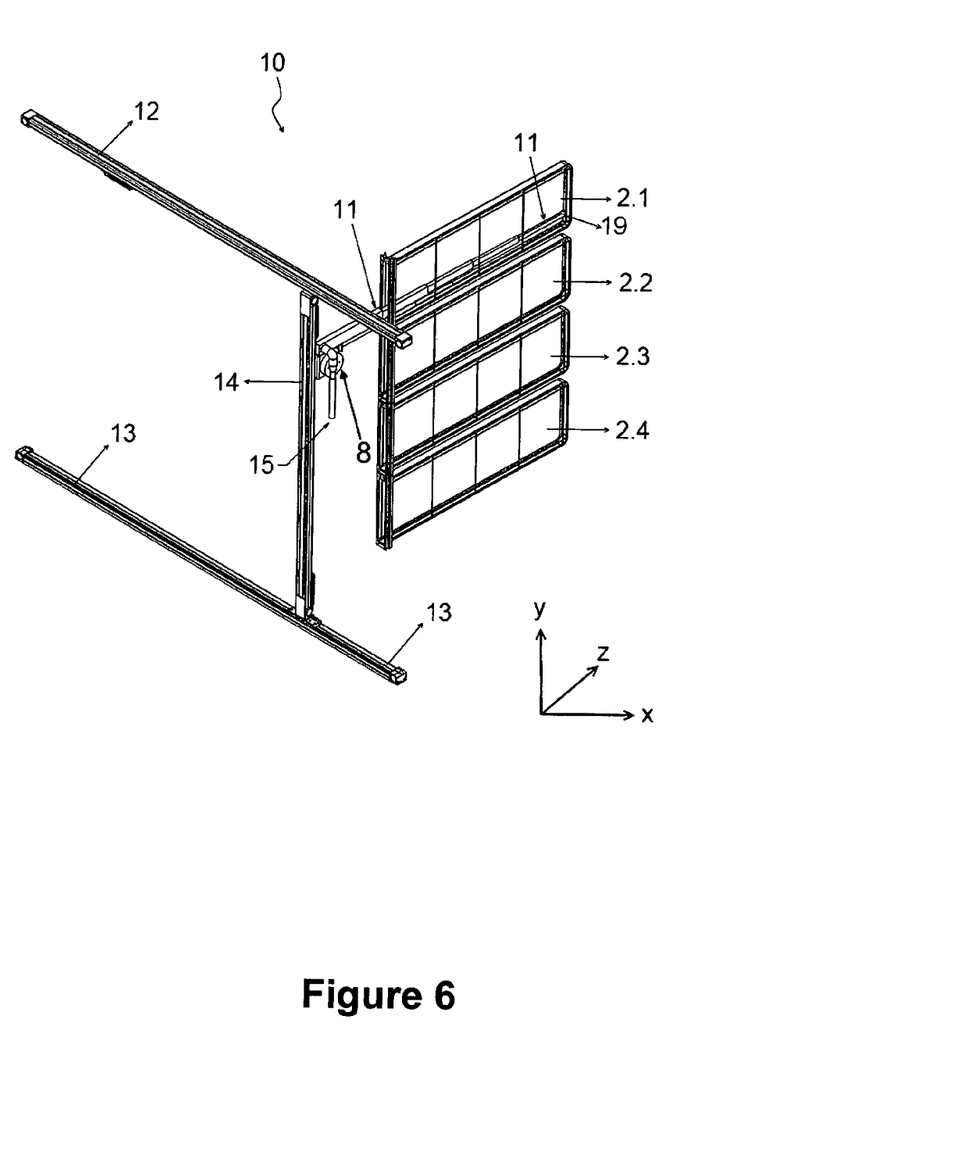
FIG. 6; A perspective view of telescopic cleaning system referred in this invention. At this stage, telescopic head is OPEN and at the level of $1^{st}$ level of filter bottom part.
Figure 7:
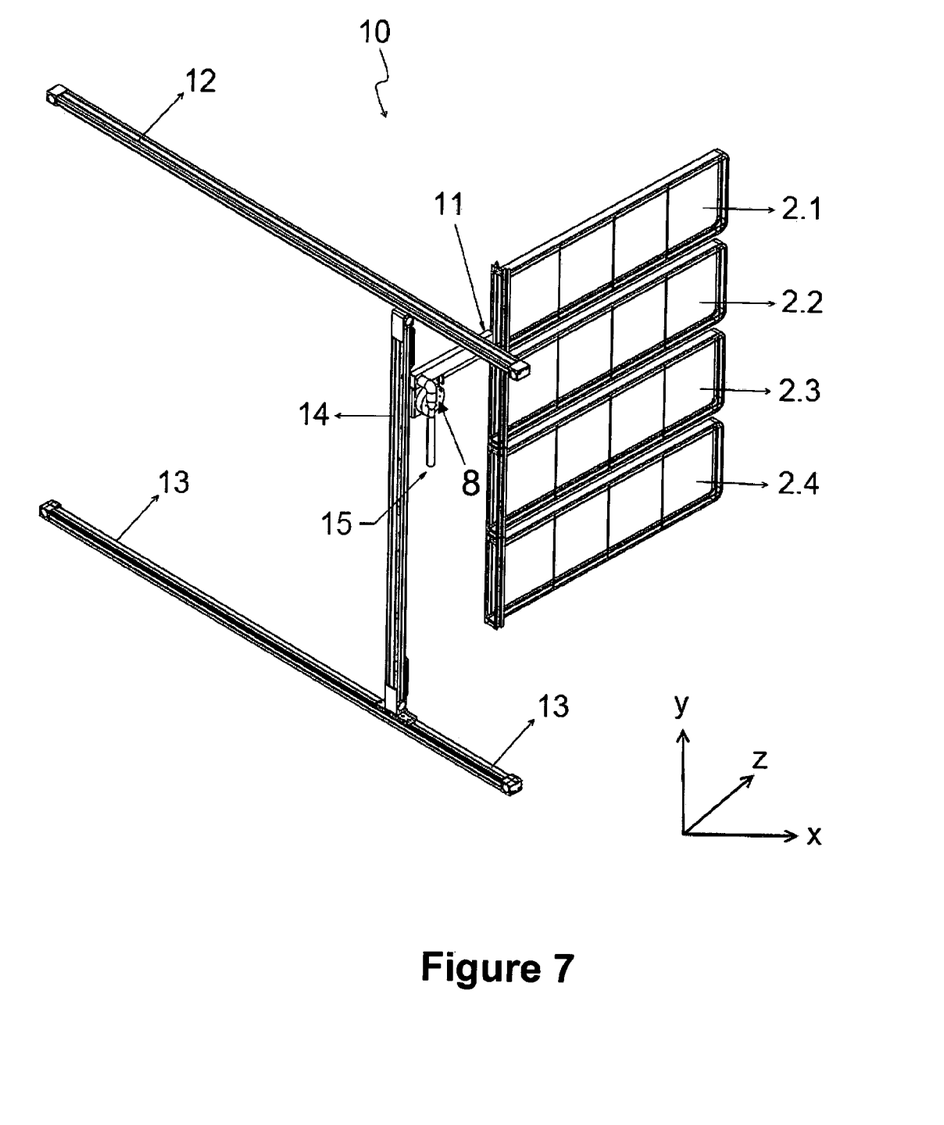
FIG. 7; A perspective view of telescopic cleaning system referred in this invention. At this stage, telescopic head is CLOSED and at the level of $1^{st}$ level of filter bottom part.

In FIG. 6, telescopic head (11) is in open position and at the bottom end of cassette filter (2.1). Afterwards, air jet application is turned off and telescopic head is closed as shown in FIG. 7.

Figure 8:
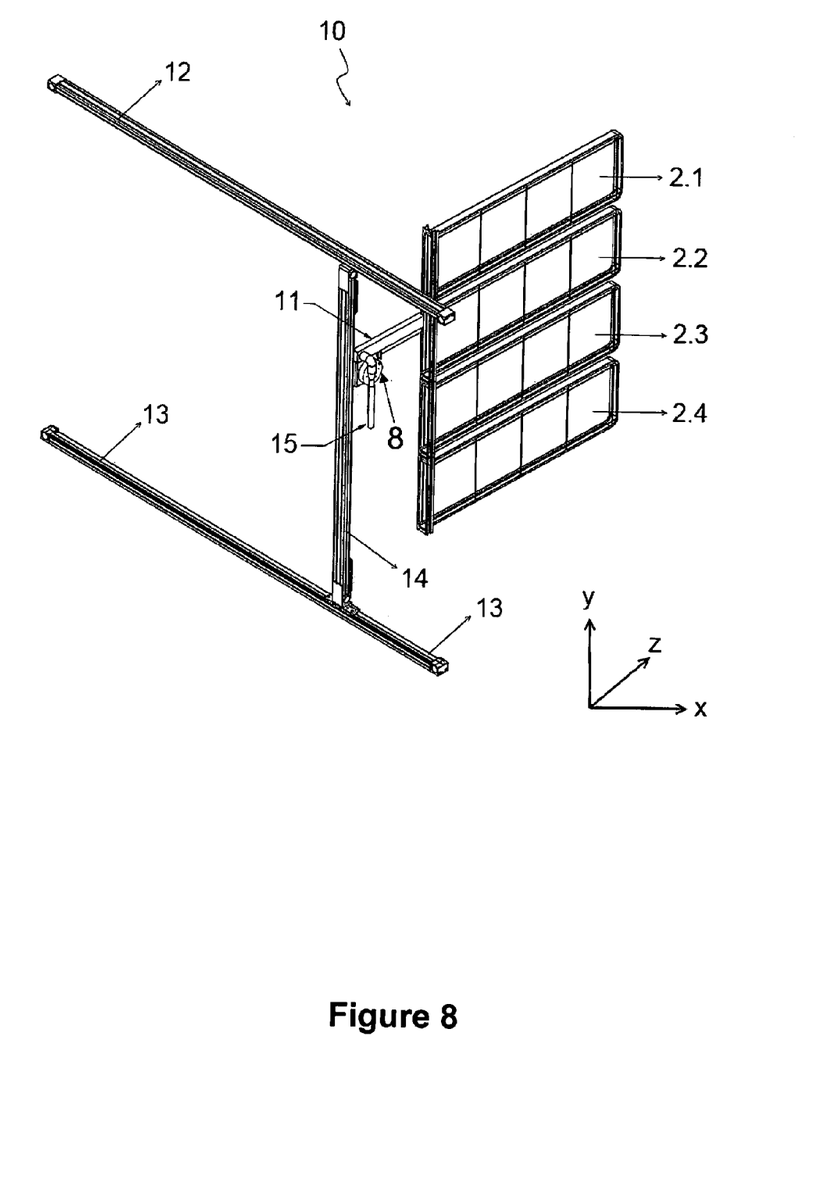
FIG. 8; A perspective view of telescopic cleaning system referred in this invention. At this stage, telescopic head is CLOSED and at the level of 2nd level of filter top part.
Figure 9:
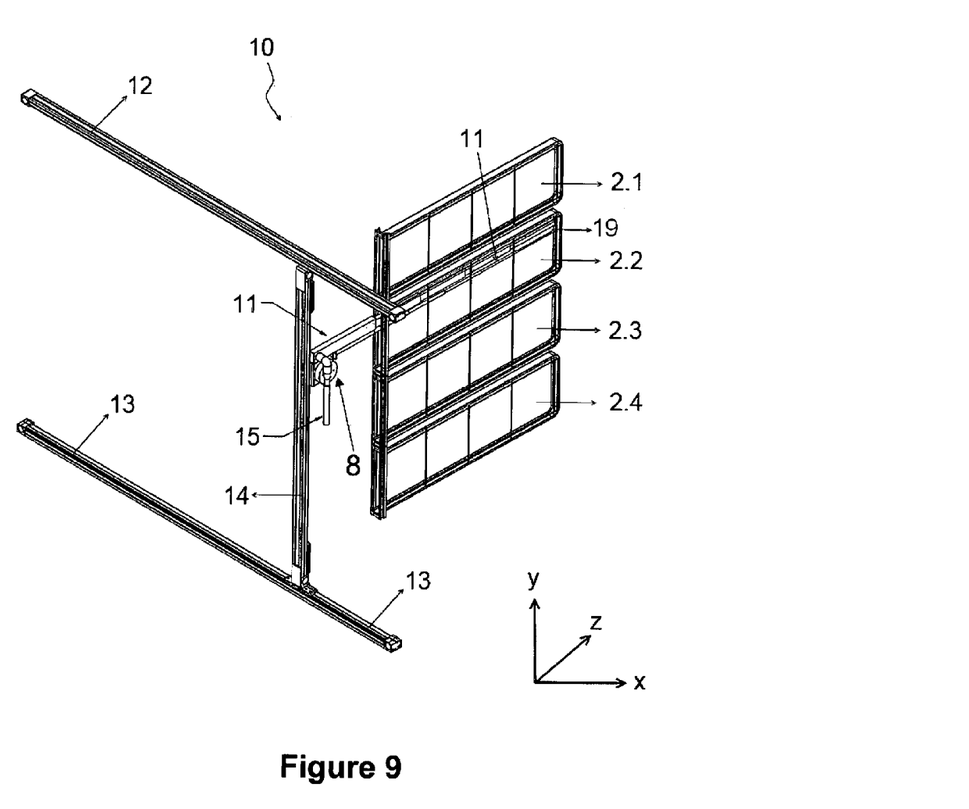
FIG. 9; A perspective view of telescopic cleaning system referred in this invention. At this stage, telescopic head is OPEN and at the level of 2nd level of filter top part.

In FIG. 8, telescopic head (11) is moved towards to following cassette filter (2.2) in the direction of Y axes. Consequently, above cycle is repeated as initiated in FIG. 9.

As explained above, following cassette filters (2.3 & 2.4) are also cleaned with the same principle. Afterwards, telescopic head (11) as well as vertical driving unit (14) is moved to adjacent filter raw by the help of horizontal driving units (12 & 13). By this movement, all other filter's cleaning is repeated.

During each cleaning cycle, filter quality control sensor (19) at the front of telescopic head (10) checks the air quality and compares with reference value. In case of exceeding value is recognized, sensor identifies the filter as faulty filter and triggers an alarm signal. Through a monitoring program with a PLC shows schematically the faulty filter to operators.

The most important benefit of invented telescopic filter cleaning system (1) is to save energy by eliminating the usage of compressed air for filter cleaning purpose. In new design, necessary cleaning air for filter's (2) cleaning is generated & received from the exhaust of suction fan on the way to discharge to atmosphere through a connection and accelerating unit (17).

With this solution, regular units of existing design as compressed air tanks, control valves, automatic controllers and lots of cabling are avoided and system becomes more simplified and reliable. This helps reducing the risk of sub functions faults from factories main operational systems. Simplified structure brings also benefit as to reduce operational expenses as well as initial investment sizes of a factory. It's been avoided the necessity of compressed air generation plants in order to run such filtering systems and also avoids further investment needs.

Telescopic head (11) is able to move in 3 dimensional directions. With this functionality, telescopic head reaches to entire surface of each filter section effectively and clean the surfaces completely & properly. On the other side, with the help of locating a controlling/monitoring sensor on telescopic head, each filter is able to be controlled individually and any unexpected faults can be detected immediately. By this option, faulty filter (2) can be identified & replaced easily and in a short downtime of supporting factory operation and avoids discharging un-cleaned air to atmosphere.

Telescopic head (11) is able apply cleaning air to the full surface of cassette filters (2) at the required amount with balanced distribution. By this solution, cassette filters (2) remains clean during the entire life time and generates relatively less resistance (pressure drop) than existing filtering systems. This means suction fan (6) runs at lower power consumption while providing required air volume to main systems being served. Less energy consumption turns to important criteria for new system benefit recognition.

With this invention, it has been provided a simplified system with easy accessibility and maintenance opportunity during normal operation. With this functionality, factory main operations are supported with downtime free sub systems.

This invention can be applied to all such systems, which either require an on line air cleaning system for process feeding like energy plants engine & turbine inlet air or polluted air to be discharged from process to be cleaned prior to send atmosphere.

The invention claimed is:
1. A filter unit comprising:
a filtration system comprising a dirty air section, a cleaned air section and a plurality of cassette filters disposed between the dirty air section and the clean air section, wherein the cleaned air section comprises at least one outlet for air cleaned by the plurality of cassette filters;
wherein the at least one outlet is attached to a clean air plenum in fluid communication with an exhaust air fan and an exhaust chimney, wherein the exhaust fan generates an air flow so that fluid flows from the filtration system, into the clean air plenum and out of the chimney;
wherein the filter unit further comprises a telescopic cleaning system for cleaning the plurality of cassette filters, wherein the telescopic cleaning system comprises:
a telescopic cleaning head that is configured to extend the length of one cassette filter from the plurality of cassette filters by the help of a mechanical driving motor such that the telescopic cleaning head travels inside of the one cassette filter such that the cleaning head applies accelerated cleaning air reversely to the both sides of the one cassette filter;
a vertical linear shaft holding the telescopic cleaning head wherein the vertical linear shaft is configured for driving the telescopic cleaning head up and down in the Y axis;
two horizontal linear shafts holding the telescopic cleaning head and the vertical linear shaft, the horizontal shafts driving the telescopic cleaning head and the vertical linear shaft forward and backward in the X axis;
an air inlet to connect the accelerated cleaning air to the telescopic cleaning head;
a piping to transfer air from a discharge end of the exhaust air fan to the air inlet of the telescopic cleaning head; and
a conically narrowing unit on the piping to generate the accelerated cleaning air from the exhaust fan discharge, the conically narrowing unit working as an accelerator with Bernoulli principle to speed up the air to be supplied to the telescopic cleaning head.

2. The filter unit according to claim 1, wherein the filter unit comprises at least one filter quality control sensor with the capability of measuring air quality in terms of dust content and dirtiness level, comparing with stored reference values and able to generate signal in order to identify a potential faulty cassette filter in the filtration unit.

* * * * *